Patented Dec. 9, 1952

2,621,178

UNITED STATES PATENT OFFICE 2,621,178

3,20-DIACYLOXY-9(11),17(20)-DIOXIDO-5,7-PREGNADIEN ADDUCTS

Robert H. Levin, A Vern McIntosh, Jr., and George B. Spero, Kalamazoo, Mich., assignors to The Upjohn Company, Kalamazoo, Mich., a corporation of Michigan No Drawing. Application August 23, 1950, Serial No. 181,113

4 Claims. (Cl. 260—239.55)

The present invention relates to adducts of 3,20-diacyloxy-9(11),17(20)-dioxido - 5,7 - pregnadien with certain dienophilic anhydrides and esters, and to a process for the production thereof.

The compounds of the present invention may be represented by the structural formula:

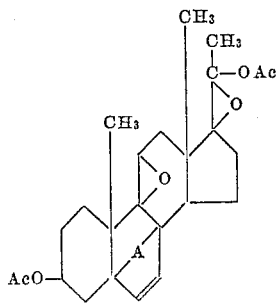

wherein Ac is the residue of an organic carboxylic acid, especially such acids containing from one to eight carbon atoms, inclusive; and A is an adduct radical derived from a dienophile selected from the group consisting of maleic anhydride and maleic acid diesters containing from one to eight carbon atoms, inclusive, in the esterifying group.

It is an object of the present invention to provide a novel group of compounds which are useful in the preparation of steroid compounds containing an oxygen atom at carbon atom eleven. Another object of the invention is the provision of a process for the production of the novel compounds, adducts of 3,20-diacyloxy-9(11),17(20)-dioxido-5,7-pregnadien. Other objects of the invention will become apparent hereinafter.

The compounds of the present invention, as previously stated, are useful in the preparation of steroid compounds having an oxygen atom attached to carbon atom eleven. Such compounds are of particular interest in the field of steroid research due to the biological activity of the cortical hormones and certain known derivatives thereof, which oxygenated steroids are known to have biological effects differing markedly from the unoxygenated steroids. It is, therefore, of importance to investigate the oxygenated derivatives of such adducts, particularly those oxygenated at carbon atom eleven, as well as to investigate the biological activity of the adducts themselves and their transformation products. The importance of such investigation is moreover emphasized by the acute shortage of adrenal cortical hormones, and the absence of any present suggestion for alleviation of the said shortage except through organic synthesis.

Novel compounds of the present invention which are of particular interest are those compounds of the above generic formula wherein Ac represents the residue of a carboxylic acid containing up to and including eight carbon atoms. Among the acids which can be used are formic, acetic, propionic, butyric, valeric, hexanoic, heptanoic, octanoic, succinic, glutaric, cyclopentanoic, cyclohexanoic, benzoic, toluic, and the like. Preferred acids are the lower-aliphatic acids. The acids may also contain substituents, such as halo, alkyl, and methoxy, which are non-reactive under the reaction conditions employed. The adduct bridge (—A—) in such compounds may be represented by the graphic formula:

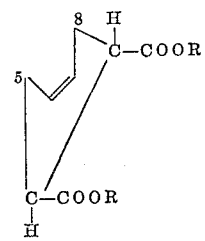

wherein R represents the organic residue of an alcohol. Such esters include the methyl, ethyl, propyl, isopropyl, butyl, isobutyl, lauryl, heptyl, octyl, cyclopentyl, cyclohexyl, benzyl, and like esters. The esterifying radical may also contain non-reactive substituents, such as halo, methoxy, or hydroxy, if desired. While the esters of the maleic acid adduct are described herein with particular reference to the methyl esters, the preferred embodiment of R is a lower-alkyl radical containing from one to eight carbon atoms, inclusive. Alternatively, the adduct may be depicted by the graphic formula:

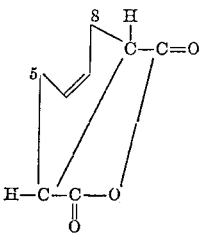

which is representative of the maleic anhydride adduct.

The compounds of the invention are usually colorless crystalline solids, which are soluble in ether, halogenated hydrocarbons, acetone, ethyl acetate, and benzene.

The 3,20-diacyloxy-9(11),17(20)-dioxido-5,7-pregnadien adducts of the present invention have the formula:

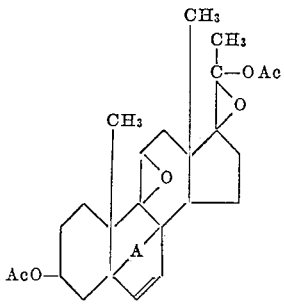

wherein A and Ac have the values previously stated.

The preparation of the 3,20-diacyloxy-9(11),-17(20)-dioxido-5,7-pregnadien adducts of the present invention involves the oxidation of the corresponding 3,20-diacyloxy-5,7,9(11),17(20)-pregnatetraene adduct using an organic peracid or hydrogen peroxide as the oxidant. Hydrogen peroxide is usually employed in the form of a twenty to ninety percent by weight aqueous solution, a thirty percent solution being preferred. The reaction is carried out by stirring the adduct and oxidant together, preferably in an organic medium which is non-reactive under the reaction conditions. Suitable media include chloroform, carbon tetrachloride, mixtures of ether and chloroform, glacial acetic acid, and many others. The ratio of oxygen-furnishing agent to steroid can be varied considerably within broad ranges. Ratios of up to twenty moles to one are operative, but ratios of from two to eight moles per mole of steroid are preferred for attainment of optimum yields, the exact ratio being preferably varied inversely with the reaction time desired to be employed. The temperature of the mixture is usually maintained at from about zero degrees to about 100 degrees centigrade for a suitable period, e. g., from about one-half to twenty-four hours, depending on the concentration of oxygen-furnishing agent, and the 9(11),17(20)-dioxido compound then isolated in any convenient manner, such as by volatilizing the reaction medium, extracting the residue with chloroform, volatilizing the chloroform, and recrystallizing the residue from any organic solvent. Alternatively, the compounds may be recovered by pouring the reaction product into water, filtering the solution, and drying the precipitate. The dioxido compound is usually obtained in a state of high purity after one or two recrystallizations. A convenient reaction medium when the oxidant is hydrogen peroxide is glacial acetic acid, and, when such is employed, the dioxido compound is separated readily by pouring the reaction product onto cracked ice and extracting the 9(11),17(20)-dioxido compound with methylene chloride, evaporating to dryness, and recrystallizing the dried crude product, e. g., from isopropyl ether.

The starting adducts of 3,20-diacyloxy-5,7,9-(11),17(20)-pregnatetraenes have the formula:

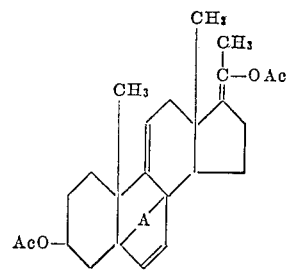

wherein A is an adduct radical derived from a dienophile selected from the group consisting of maleic acid anhydride and maleic acid diesters, and wherein Ac has the value previously assigned. These compounds are conveniently prepared by heating the corresponding 3-hydroxy- or 3-acyloxy-5,7,9(11)-pregnatrien-20-one maleic acid, maleic acid anhydride, or maleic acid ester adduct with a large excess of an organic carboxylic acid anhydride in the presence of a small amount of the alkali metal salt of the acid corresponding to the anhydride employed or an acid catalyst such as para-toluene sulfonic or sulfuric acid. The preferred anhydride is acetic anhydride, but other anhydrides, such as propionic, butyric, valeric, hexanoic, heptanoic, and octanoic anhydrides, as well as benzoic acid anhydride, ortho-toluic acid anhydride, and the like are also operative. The acid anhydrides can also be substituted by non-reactive groups, such as halo, alkyl, and methoxy, as in the case of chloroacetic, ortho-toluic, or methoxybenzoic acid anhydrides. Ordinarily the reaction is heated at about 140 degrees centigrade for from about four to six hours, but temperatures as low as 100 and as high as 180 degrees centigrade are also operative. The reaction is usually conducted at the boiling point of the anhydride, but in the case of the higher-boiling anhydrides, such as benzoic anhydride, a suitable temperature control or organic solvent, preferably so as to maintain the temperature between about 100 and 150 degrees centigrade, should be used, since the adduct otherwise tends to decompose in the higher temperature range. If a 3-hydroxy 20-keto adduct is thus reacted with an anhydride, the hydroxy group is usually acylated, and, similarly, if a maleic acid adduct is used instead of a diester or an anhydride, the anhydride will be formed. The enol ester can be isolated by removing the excess anhydride under reduced pressure and separating the ester from alkali metal salts, which procedure gives a product sufficiently pure for most purposes, but which can be further purified by recrystallization from acetone-water, acetone-pentane, or like solvents, if desired.

The 3-acyloxy-5,7,9(11)-pregnatrien-20-one adducts are conveniently prepared by the selective oxidation of an enol ester of an adduct of 3-acyloxybisnor-5,7,9(11)-cholatrien-22-al, represented by the formula:

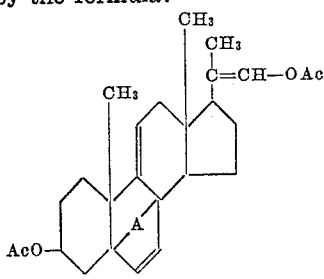

wherein A and Ac have the values previously given.

Adducts of 3,22-diacyloxybisnor-5,7,9(11),20(22)-cholatetraenes [22-enol esters of 3-acyloxybisnor-5,7,9(11)-cholatrien-22-als] are conveniently prepared by subjecting an adduct of a 3-acyloxybisnor-5,7,9(11)-cholatrien-22-al, of the formula:

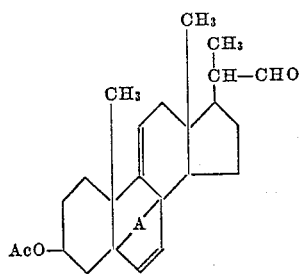

wherein A and Ac have the values previously given, to the action of an acid anhydride or an acid halide in the presence of an alkaline salt of the acid. The starting adducts of 3-acyloxybisnor-5,7,9(11)-cholatrien-22-als can be prepared from adducts of 3-esters of dehydroergosterol by selective oxidation as described and claimed in the copending application Serial 111,100 of Robert H. Levin, filed August 18, 1949, and as more fully described hereinafter.

The 3-esters of dehydroergosterol, from which the 3 - acyloxybisnor - 5,7,9(11) - cholatrien-22-al adducts are prepared, can be synthesized in several ways starting with ergosterol. For example, ergosterol can be transformed to dehydroergosterol with mercuric acetate according to known methods [Windaus et al., Ann. 465, 157 (1928)] and the 3-hydroxy group of the dehydroergosterol acylated by known procedure. Alternatively the 3-hydroxy group of ergosterol can be acylated prior to the preparation of the dehydro derivative, a procedure which is particularly preferred in the preparation of the 3-acetoxy derivative. The adducts of dehydroergosterol are then prepared by the addition of maleic anhydride or the like to dehydroergosterol or a 3-ester thereof according to known methods [Honigmann, Ann. 508, 89 (1934)]. The anhydrides can then be converted to their corresponding acids and esters if desired.

The ester group, when present in the 3-position of dehydroergosterol, is for the purpose of protecting the 3-hydroxy group in subsequent chemical reactions. For this purpose any convenient ester of an organic carboxylic acid, which is non-reactive under the conditions of the reaction, is suitable. The preferred acids are the fatty acids such as formic, acetic, propionic, butyric, valeric, hexanoic, heptanoic, octanoic; dibasic acids such as malonic, succinic, phthalic; cycloaliphatic acids such as cyclopentanoic and cyclohexanoic; and aromatic acids such as benzoic, toluic, and the like. The acids may also contain substituents such as halogen, alkyl, the methoxy radical, and the like, and these substituents will be carried throughout the synthesis. If desired, the acyl group can be changed to another acyl group by saponifying the ester to give a 3-hydroxy compound, which can then be re-esterified as previously described.

A preferred method for preparing some of the dehydroergosteryl adducts comprises the saponification of a 3-acyloxy-adduct of dehydroergosterol with dilute alkali followed by acidification. The 3-hydroxy dicarboxylic acid thus formed can be converted to the 3-hydroxy anhydride by heat, or it can be converted to any desired 3-acyloxy anhydride adduct by heating under reflux with the appropriate acid anhydride or chloride in pyridine solution. Dialkyl esters of the previously mentioned dicarboxylic acid adducts can be prepared by subjecting the acid to the action of an esterification reagent such as a diazoalkane [Wilds et al., J. Org. Chem. 13, 763 (1948)], e. g., diazomethane, diazoethane, diazobutane, and the like.

The selective oxidation of an adduct of dehydroergosterol, or a 3-ester thereof, to produce an adduct of 3-hydroxybisnor-5,7,9(11)-cholatrien-22-al, or a 3-ester thereof, is accomplished by dissolving the dehydroergosteryl adduct in a suitable solvent, cooling to about minus 80 to plus 30 degrees centigrade, and passing ozone into the solution until about 1.0 to 1.25 moles of ozone per mole of adduct have been absorbed. The temperature of the solution should be maintained below plus 30 degrees centigrade, preferably between a temperature of minus 30 and minus 70 degrees centigrade, during the addition of ozone, although temperatures as low as minus 80 and as high as plus 30 degrees centigrade are operative. The lower temperatures of the preferred range are readily obtained by cooling the solution of the adduct with a bath of solid carbon dioxide in acetone or the like, although various other methods of cooling can be used. Many of the customary solvents used in ozonizations such as chloroform, acetic acid, carbon tetrachloride, ethylene chloride, methylene chloride, and the like, can be used.

The ozonides are then decomposed under reducing conditions, that is, in the absence of oxidizing agents, whether added or formed in the course of the reaction by products of decomposition of the ozonide. This means that excess oxygen formed by decomposition of the ozonide is prevented from forming hydrogen peroxide by combining with any moisture present, and that molecular oxygen is prevented from oxidizing the aldehyde thus formed. This can be conveniently accomplished by decomposing the ozonide in glacial acetic acid by the addtion of finely-powdered zinc.

As is conventional with ozonizations when conducted in solvents, other than glacial acetic acid, the solvent used for ozonization is replaced, after completion of the ozonization, by adding glacial acetic acid and removing the lower-boiling solvent by fractional distillation. Alternatively, the solvent can be removed by careful warming under reduced pressure prior to the addition of glacial acetic acid, if desired.

After decomposition of the ozonide and removal of the zinc, the aldehyde can be recovered by diluting the acetic acid with water, or in other conventional manner, such as by formation of an aldehyde derivative, e. g., the dinitrophenylhydrazone.

Adducts of 3,22-diacyloxybisnor-5,7,9(11),20-(22)-cholatetraenes [22-enol-esters of adducts of 3-acyloxybisnor-5,7,9(11)-chloratrien-22-als] can be conveniently prepared by heating the corresponding 3-hydroxy or acyloxy aldehyde maleic acid, maleic acid anhydride, or maleic acid ester adduct with a large excess of an organic carboxylic acid anhydride in the presence of a small amount of the alkali metal salt of the acid corresponding to the anhydride employed or an acid catalyst such as para-toluene sulfonic or sulfuric acid. The preferred anhydride is acetic anhydride, but other anhydrides, such as propionic, butyric, valeric, hexanoic, and octanoic anhydrides, as well as benzoic acid anhydride, ortho-toluic acid anhydride, and the like, are also operative. The acid anhydrides can also be substituted by non-reactive groups, such as halo, alkyl, and methoxy, as in the case of chloroacetic, ortho-toluic, or methoxybenzoic acid anhydrides. The reaction can be conveniently followed by observing the color changes in the reaction mixture, optimum yields being obtained by discontinuing the application of heat when the color of the solution changes from yellow to brown. Ordinarily the reaction is heated at about 140 degrees centigrade for from about four to six hours, but temperatures as low as 100 and as high as 180 degrees centigrade are also operative. The reaction is usually conducted at the boiling point of the anhydride, but in the case of the higher-boiling anhydrides, such as benzoic anhydride, a suitable temperature control, such as 100–150 degrees centigrade, must be used, since the adduct otherwise tends to decompose in the higher temperature range. If a 3-hydroxy aldehyde adduct is thus reacted with an anhydride, the hydroxy group will be acylated, and, similarly, if a maleic acid adduct is used instead of a diester or an anhydride, the anhydride will be formed. The enol ester can be isolated by removing the excess anhydride under reduced pressure and separating the enol ester from alkali metal salts, which procedure yields a product sufficiently pure for most purposes, but which can be further purified by recrystallization from acetone-water, acetone-pentane, or like solvents, if desired.

The ozonization of the thus-prepared enol acylate to prepare 3-acyloxy-5,7,9(11)-pregnatrien-20-one adducts involves dissolving the enol ester in a suitable solvent, cooling to about minus eighty degrees centigrade to plus thirty degrees centigrade, and passing ozone, ozonized air, or ozonized oxygen into the solution until about 1.0 to about 1.25 moles, preferably 1.0 to 1.1 moles, of ozone per mole of adduct have been absorbed. The addition of ozone to the 20:22 double bond is so rapid that only a small amount of ozone escapes from the reaction mixture, and the amount of ozone ordinarily required therefore closely approximates the theoretical amount. Loss to the solvent, if any loss occurs, must be taken into consideration in calculating the amount of ozone to be introduced. The temperature of the solution should be maintained below plus thirty degrees centigrade, preferably between a temperature of minus thirty and minus seventy degrees centigrade, during the addition of ozone, although temperatures as low as minus eighty and as high as plus thirty degrees centigrade are operative. The lower temperatures of the range are readily obtained by cooling the solution of the adduct with a bath of solid carbon dioxide in acetone or the like, although various other methods of cooling may be employed. Many of the customary solvents used in ozonizations, such as chloroform, methylene chloride, ethylene chloride, carbon tetrachloride, acetic acid, and the like, can be used for the ozonization reaction.

The 20:22 ozonides thus produced are then decomposed under conditions normally employed for decomposition of such compounds. This can conveniently be accomplished by decomposing the ozonide with hydrogen peroxide, by hydrolysis, with zinc in glacial acetic acid, or by a catalytic amount of colloidal metal such as silver, platinum, or palladium in a solvent, such as glacial acetic acid, alcohol, or ethyl acetate, in which latter case reductive conditions, e. g., a hydrogen atmosphere, are also employed. The use of "reductive conditions" is well established in the art [Hill and Kelly, "Organic Chemistry," page 53, The Blackiston Company, Philadelphia (1934); Church et al., J. Am. Chem. Soc. 56, 176–184 (1934); Gilman, "Organic Chemistry," Second Edition, page 636, John Wiley and Sons, New York (1943); Long, Chem. Reviews 27, 452–454 (1940)].

As is conventional with decomposition of ozonides with zinc, when the ozonizations are conducted in solvents other than glacial acetic acid, the solvent used for the ozonization is replaced, after completion of the ozonization, by adding glacial acetic acid and removing the lower-boiling solvent by fractional distillation, or the solvent can be removed by careful warming under reduced pressure prior to the addition of acetic acid, if desired. After decomposition of the 20:22 ozonide and removal of the metal, the ketone can be recovered by diluting the acetic acid with water, or by other conventional procedure for the recovery of ketones, such as by formation of a carbonyl derivative, e. g., the 2,4-dinitrophenylhydrazone. Recrystallization from acetone or the like results in a more highly purified ketone product.

The following examples are illustrative of the process and products of the present invention, but are not to be construed as limiting.

PREPARATION 1.—DIMETHYL MALEATE ADDUCT OF DEHYDROERGOSTERYL BENZOATE

To a solution of 21 grams of dimethyl maleate adduct of dehydroergosterol in 69 milliliters of warm pyridine was added 9.5 milliliters of benzoyl chloride. After standing at room temperature for fifteen minutes, the mixture was poured into 1400 milliliters of ice-water and the solid removed by filtration, dried, and recrystallized from acetone. There was thus obtained 26.4 grams of dimethyl maleate adduct of dehydroergosteryl benzoate, melting at 203 to 205.5 degrees centigrade.

PREPARATION 2.—DIMETHYL MALEATE ADDUCT OF DEHYDROERGOSTERYL ACETATE

In a manner essentially that described in Preparation 1, the dimethyl maleate adduct of dehydroergosteryl acetate, melting at 177 to 179 degrees centigrade, was prepared from the dimethyl maleate adduct of dehydroergosterol and acetyl chloride.

PREPARATION 3.—DIMETHYL MALEATE ADDUCT OF DEHYDROERGOSTERYL FORMATE

A solution of six grams of dimethyl maleate adduct of dehydroergosterol in fifty milliliters of 87 percent formic acid was heated under reflux for one hour, cooled, and the dimethyl maleate adduct of dehydroergosteryl formate filtered therefrom. Upon crystallization from acetone, the purified material melted at 177.5 to 178.5 degrees centigrade.

PREPARATION 4.—MALEIC ACID ADDUCT OF DEHYDROERGOSTEROL

A solution of 2.0 grams of sodium hydroxide in twenty milliliters of water was added to a solution of 1.73 grams of the maleic anhydride adduct of dehydroergosteryl acetate (M. P. 230–232 degrees centigrade) in forty milliliters of dioxane. The mixture solidified, but dissolved on addition of 300 milliliters of water and heating to eighty degrees centigrade. After half an hour the solution was cooled and made acid with aqueous three normal hydrochloric acid, to give 1.61 grams of precipitate. On crystallization from a dioxane-water mixture, the maleic acid adduct of dehydroergosterol melted at 190–192 degrees centigrade.

PREPARATION 5.—MALEIC ANHYDRIDE ADDUCT OF 3-HEPTANOYLOXYDEHYDROERGOSTEROL

The maleic acid adduct of dehydroergosterol from Preparation 4 was dissolved in a mixture of seven milliliters of warm pyridine and fourteen milliliters of heptylic anhydride, and the mixture heated under reflux for one hour. About eighty percent of the reaction solvent was removed under reduced pressure, and the residue then dissolved in methyl alcohol. The methyl alcohol solution was concentrated and cooled to yield 4.8 grams of the maleic anhydride adduct of 3-heptanoyloxydehydroergosterol, melting at 186–191.5 degrees centigrade.

PREPARATION 6.—MALEIC ANHYDRIDE ADDUCT OF 3-BETA-ACETOXYBISNOR-5,7,9(11)-CHOLATRIEN-22-AL

A solution of 5.35 grams of the maleic anhydride adduct of 3-beta-acetoxydehydroergosterol in 107 milliliters of methylene chloride was cooled to about minus seventy degrees centigrade and ozonized until 505 milligrams of ozone had been absorbed. The temperature of the solution was then gradually raised to about plus ten to fifteen degrees centigrade, whereupon seventy milliliters of glacial acetic acid was added and the methylene chloride removed under reduced pressure. Seven grams of zinc dust was then added to the cold solution at a uniform rate over a period of ten minutes, while keeping the reaction temperature below plus twenty degrees centigrade. After being stirred for fifteen minutes, the mixture was filtered and the filtrate poured into water. There was thus obtained 4.31 grams of maleic anhydride adduct of 3-beta-acetoxybisnor-5,7,9(11)-cholatrien-22-al, a fine white powder which melted at 187–197 degrees centigrade.

To a solution of 0.30 gram of the maleic anhydride adduct of 3-beta-acetoxybisnor-5,7,9-(11)-cholatrien-22-al, in thirty milliliters of ethanol, was added twenty milliliters of alcohol containing one percent 2,4-dinitrophenylhydrazine and three percent concentrated hydrochloric acid. The mixture was allowed to stand for one hour at room temperature and then placed in a refrigerator to complete precipitation of the yellow crystals. The precipitate was then collected and recrystallized from a mixture of chloroform and alcohol, to give the 2,4-dinitrophenylhydrazone of the maleic anhydride adduct of 3-beta-acetoxybisnor-5,7,9(11)-cholatrien-22-al, melting at 269–271 degrees centigrade.

PREPARATION 7.—MALEIC ANHYDRIDE ADDUCT OF 3-BETA-ACETOXYBISNOR-5,7,9(11)-CHOLATRIEN-22-AL

A two-liter, round-bottom flask was charged with fifty grams (0.93 mole) of dehydroergosteryl acetate maleic anhydride adduct and one liter of methylene chloride. The solution was cooled to Dry Ice temperature with a trichloroethylene bath and ozonized oxygen passed through at a rate of 1200 milliliters of oxygen per minute (at this rate the ozonizer was producing about 36 milligrams of ozone per minute). The flow of ozonized oxygen was maintained for 128 minutes, a total of 4608 milligrams (105 percent) of ozone being passed into the solution. The reaction mixture was transferred to a two-liter, round-bottom flask fitted with a capillary and a condenser for downward distillation, 300 milliliters of acetic acid added, and the methylene chloride distilled over in vacuo at forty degrees centigrade or below. The flask was then placed in a water bath and fitted with a stirrer. An additional 200 milliliters of acetic acid was added and the ozonide decomposed by the addition of fifty grams of zinc dust. The zinc dust was added in portions over a period of twenty to thirty minutes while the solution was stirred and the temperature maintained at seventeen to twenty degrees centigrade. After addition, the mixture was stirred for another twenty minutes and then filtered. The precipitated zinc dust was washed by filtering 100 milliliters of acetic acid therethrough, and the filtrate gradually diluted with water (1100 to 1200 milliliters) until the product had been drowned out. The product was then cooled in the refrigerator overnight and filtered. The yield of crystalline product was 42 grams, assaying 89–95 percent of the desired aldehyde.

PREPARATION 8

In a manner essentially that described in Preparation 6, the following compounds were prepared.

(1) Maleic anhydride adduct of 3-beta-formoxybisnor-5,7,9(11)-cholatrien-22-al, melting at 95–130 degrees centigrade. 2,4-dinitrophenylhydrazone, melting at 165–168 degrees centigrade.

(2) Maleic anhydride adduct of 3-beta-heptanoyloxybisnor-5,7,9(11)-cholatrien-22-al, melting at 197.5–199 degrees centigrade. 2,4-dinitrophenylhydrazone, melting at 253–257 degrees centigrade.

(3) Dimethyl maleate adduct of 3-beta-benzoyloxybisnor-5,7,9(11)-cholatrien-22-al, melting at 183–187 degrees centigrade. 2,4-dinitrophenylhydrazone, melting at 224–249 degrees centigrade.

(4) Dimethyl maleate adduct of 3-beta-acetoxybisnor-5,7,9(11)-cholatrien-22-al, melting at 172–178 degrees centigrade. 2,4-dinitrophenylhydrazone, melting at 238 to 244 degrees centigrade.

(5) Dimethyl maleate adduct of 3-hydroxybisnor-5,7,9(11)-cholatrien-22-al, melting at 163–170 degrees centigrade. 2,4-dinitrophenylhydrazone, melting at 250–254 degrees centigrade.

In a manner similar to the above, the maleic anhydride adduct of 3-hydroxybisnor-5,7,9(11)-cholatrien-22-al is obtained from dehydroergosteryl maleic anhydride adduct; the maleic acid adduct of 3-hydroxybisnor-5,7,9(11)-cholatrien-22-al is obtained from dehydroergosteryl maleic acid adduct; and 3-acyloxybisnor-5,7,9(11)-cholatrien-22-al maleic acid adducts are obtained from the maleic acid adduct of 3-acyloxydehydroergosterols.

PREPARATION 9.—DIMETHYL MALEATE ADDUCT OF 3-HYDROXYBISNOR-5,7,9(11)-CHOLATRIEN-22-AL

A solution of 2.69 grams (.005 mole) of the dimethyl ester of the maleic acid adduct of dehydroergosterol, in eighty milliliters of methylene chloride, cooled by a Dry Ice and trichloroethylene bath, was treated with ozonized oxygen until 247.36 milligrams (.0051 mole) of ozone was absorbed. The solution was then allowed to warm to room temperature, whereafter thirty milliliters of acetic acid was added and the methylene chloride removed in vacuo. While cooling in a waterbath at fifteen degrees centigrade, four grams of zinc dust was added in portions with stirring, the temperature being maintained between fifteen and twenty degrees centigrade. Stirring was continued for another fifteen minutes, whereafter the zinc was separated by filtration. The filtrate was diluted with water to cloudiness, extracted with ether, the ether extract washed with sodium bicarbonate and then with water to neutrality, the solution then dried over sodium sulfate and evaporated to dryness in vacuo. The residue was crystallized from acetic acid and water, giving 1.92 grams (81.5 percent of the theoretical), melting point 91–97 degrees centigrade, which yielded a dinitrophenylhydrazone derivative in 72.5 percent yield, melting point 212–238 degrees centigrade. The aldehyde was recrystallized and found to have a purified melting point of 163–170 degrees centigrade, while the dinitrophenylhydrazone derivative was recrystallized until a melting point of 250–254 degrees centigrade was attained.

PREPARATION 10.—MALEIC ANHYDRIDE ADDUCT OF 3-BETA-ACETOXY-22-ACETOXYBISNOR-5,7,9(11),20(22)-CHOLATETRAENE

A mixture of twenty grams of the maleic anhydride adduct of 3-beta-acetoxybisnor-5,7,9(11)-cholatrien-22-al, six grams of anhydrous sodium acetate, and 600 milliliters of acetic anhydride, was heated under reflux for six hours, whereafter volatile components were removed under reduced pressure. The resulting solid was digested with five fifty-milliliter portions of boiling acetone for five minutes each, and the extracts combined and diluted with 130 milliliters of water. There was thus obtained sixteen grams of the maleic anhydride adduct of 3 - beta - acetoxy - 22 - acetoxybisnor - 5,-7,9(11), 20(22)-cholatetraene, which melted at 186 to 193 degrees centigrade. Recrystallization of the crude product from a mixture of acetone and pentane raised the melting point to 200.5 to 202 degrees centigrade.

PREPARATION 11

In a manner essentially that described in Preparation 10, the following compounds were prepared:
(1) The dimethyl maleate adduct of 3-beta-benzoyloxy - 22 - acetoxybisnor - 5,7,9(11),20-(22)-cholatetraene, which melted at 210 to 211 degrees centigrade.
(2) The dimethyl maleate adduct of 3-beta-acetoxy - 22 - acetoxybisnor - 5,7,9(11),20(22)-cholatetraene, which melted at 181 to 183 degrees centigrade.

In the same manner as given above, 22-acyloxy, e. g., formoxy, acetoxy, propionoxy, butyroxy, valeroxy, hexanoyloxy, heptanoyloxy, octanoyloxy, benzoyloxy, naphthoyloxy, and the like 3 - acyloxybisnor - 5,7,9(11),20(22)-cholatetraene adducts, are obtained from the compounds of Preparations 6, 7, and 8. Such representative compounds include 3 - formoxy - 22-acetoxybisnor - 5,7,9(11),20(22)-cholatetraene, 3 - propionoxy - 22 -acetoxybisnor - 5,7,9(11),-20(22) - cholatetraene, 3,22 - dipropionoxybisnor - 5,7,9(11),20(22) - cholatetraene, 3,22 - dibenzoyloxybisnor - 5,7,9(11),20(22) - cholatetraene, and 3 - heptanoyloxy - 22 -octanoyloxybisnor - 5,7,9(11),20(22) - cholatetraene adducts with maleic anhydride or maleic acid esters such as the dimethyl maleate, diethyl maleate, dipropyl maleate, diisopropyl maleate, dibutyl maleate, dioctyl maleate, dibenzyl maleate, and the like.

PREPARATION 12.—MALEIC ANHYDRIDE ADDUCT OF 3-BETA-ACETOXY-5,7,9(11)-PREGNATRIEN-20-ONE

A solution of 5.08 grams of the maleic anhydride adduct of 3-beta-acetoxybisnor-5,7,9-(11)-cholatrien-22-al enol acetate in 100 milliliters of methylene chloride was cooled to about minus seventy degrees centigrade and ozonized until 483 milligrams of ozone had been absorbed. Fifty milliliters of glacial acetic acid was then added and the methylene chloride removed under reduced pressure. An additional thirty milliliters of glacial acetic acid was then added and the ozonide decomposed by adding seven grams of powdered zinc at a substantially uniform rate while maintaining the reaction temperature between seventeen and twenty degrees centigrade. The mixture was stirred for an additional twenty minutes, filtered, and the zinc washed with 140 milliliters of glacial acetic acid. The organic extracts were combined and diluted with seventy milliliters of water. When crystallization commenced, the rate of precipitation was increased by addition of two volumes of water. There was thus obtained 4.0 grams of the maleic anhydride adduct of 3-beta-acetoxy-5,7,9(11)-pregnatrien-20-one, which melted at 240–264.5 degrees centigrade. Several recrystallizations of the crude material from acetone raised the melting point to 263.5 to 264.5 degrees centigrade.

PREPARATION 13.—MALEIC ACID ADDUCT OF 3-BETA-HYDROXY-5,7,9(11)-PREGNATRIEN-20-ONE

A solution of 4.52 grams (0.0100 mole) of the maleic anhydride adduct of 3-beta-acetoxy-5,-7,9(11)-pregnatrien-20-one, M.P. 263–264.5 degrees centigrade, in a mixture of 100 milliliters of 1,4-dioxane and 400 milliliters of water containing four grams (0.10 mole) of sodium hydroxide was allowed to stand at room temperature for two and one-half hours, whereupon a small quantity of plate-like crystals formed. These were dissolved by heating the mixture to seventy degrees centigrade for one-half hour. The reaction mixture was then made acid with fifty milliliters of three normal hydrochloric acid and refrigerated to give a precipitate of 3.05 grams of needle-like crystals melting at 173–177 degrees centigrade. On crystallization from a dioxane-water mixture, the compound melted at 211–215 degrees centigrade. The melting point was found to vary somewhat with the rate of heating.

Analysis:
Calculated for $C_{25}H_{32}O_6$_ C 70.07; H 7.53
Found _____ C 69.80; H 7.47

PREPARATION 14.—DIMETHYL MALEATE OF 3-BETA-HYDROXY-5,7,9(11)-PREGNATRIEN-20-ONE

A suspension of 0.400 gram of the maleic acid adduct of 3-beta-hydroxy-5,7,9(11)-pregnatrien-20-one, in fifty milliliters of dry ether, was cooled in an ice-salt bath while a slight excess of diazomethane in methylene chloride was added over a 25 minute period with stirring. Ten minutes after addition was complete, the solution was placed on a steam bath and concentrated rapidly to dryness. The residue was crystallized from an acetone-water mixture to give 0.34 gram of the dimethyl maleate of 3 - beta - hydroxy - 5,7,9(11) - pregnatrien-20-one, melting at 193–195 degrees centigrade. After chromatography and recrystallization, the compound melted at 192–197 degrees centigrade.

In the same manner as given above, other dialkyl maleates, e. g., the diethyl, dipropyl, diisopropyl, dibutyl, and dioctyl maleates of 3-hydroxy-5,7,9(11)-pregnatrien-20-one are prepared from 3-hydroxy-5,7,9(11)-pregnatrien-20-one maleic acid adduct and the appropriate diazoalkane, or by other equivalent esterification procedure.

PREPARATION 15.—DIMETHYL MALEATE OF 3-BETA-ACETOXY-5,7,9(11)-PREGNATRIEN-20-ONE

A solution of 0.15 gram of the dimethyl maleate adduct of 3-beta-hydroxy-5,7,9(11)-pregnatrien-20-one, in 2.5 milliliters of acetic anhydride and 2.5 milliliters of pridine, was heated on the steam bath for ninety minutes, cooled to room temperature, and poured into ice-water. The resulting precipitate was collected by filtration and found to melt at 205–209 degrees centigrade. Recrystallization from methanol gave the dimethyl maleate of 3-beta-acetoxy-5,7,9(11)-pregnatrien-20-one, melting at 207–211 degrees centigrade.

Analysis:
Calculated for $C_{29}H_{38}O_7$ -- C, 69.86; H, 7.68
Found ------------------ C, 69.81; H, 7.86
                         69.70;    7.62

By the same manner of esterification, the following C–3 esters were prepared: (1) dimethyl maleate adduct of 3-beta-formoxy-5,7,9(11)-pregnatrien-20-one, melting point 223–230 degrees centigrade, and (2) the dimethyl maleate adduct of 3-beta-benzoyloxy-5,7,9(11)-pregnatrien-20-one, melting point 250–254 degrees centigrade.

PREPARATION 16.—MALEIC ANHYDRIDE ADDUCT OF 3-BETA-HEPTANOYLOXY-5,7,9(11)-PREGNATRIEN-20-ONE

The maleic anhydride adduct of 3-beta-heptanoyloxy-5,7,9(11) - pregnatrien - 20 - one, melting point 170–171 degrees centigrade, was prepared by refluxing the maleic acid adduct of 3-beta-hydroxy-5,7,9(11)-pregnatrien - 20 - one with heptylic anhydride and pyridine for a period of twenty hours, and working up the reaction product in the usual manner.

PREPARATION 17.—MALEIC ANHYDRIDE ADDUCT OF 3-BETA-HYDROXY-5,7,9(11)-PREGNATRIEN-20-ONE

Similarly, the maleic anhydride adduct of 3-beta-hydroxy-5,7,9(11)-pregnatrien - 20 - one, melting point about 195 degrees centigrade, was prepared by refluxing the maleic acid adduct of 3-beta-hydroxy-5,7,9(11)-pregnatrien - 20 - one with Dowtherm for eight hours. The 3-hydroxy-maleic anhydride adduct is also obtained by heating the 3-hydroxy maleic acid adduct to just above its melting point, which procedure causes water to be evolved, with the closing of the anhydride ring.

In the same manner as given above, still other 5,7,9(11)-pregnatrien-20-one adducts are prepared from the corresponding 3,22-diacyloxy-bisnor-5,7,9(11),20(22)-cholatetraene maleic acid anhydride, and maleic acid diester adducts. Such compounds include the 3-formoxy-5,7,9-(11)-pregnatrien-20-one maleic acid, maleic acid anhydride, dimethyl maleate, diethyl maleate, dibutyl maleate, dioctyl maleate, diisopropyl maleate, dibenzyl maleate, and like adducts; the corresponding 3-propionoxy, butyroxy, valeroxy, hexanoyloxy, heptanoyloxy, octanoyloxy, naphthoyloxy, benzoyloxy, and similar 20-ketone adducts, including, for example, 3-propionoxy-5,7,9(11)-pregnatrien - 20 - one dipropyl maleate, 3-benzoyloxy-5,7,9(11)-pregnatrien-20-one maleic anhydride adduct, 3-heptanoyloxy-5,7,9(11)-pregnatrien-20 - one dimethyl maleate, 3-valeroyloxy-5,7,9(11)-pregnatrien-20-one maleic acid anhydride adducts, and the like.

PREPARATION 18.—MALEIC ANHYDRIDE ADDUCT OF 3-BETA-,20-DIACETOXY-5,7,9(11),17(20)-PREGNATETRAENE

A solution of 2.25 grams (.005 mole) of the maleic anhydride adduct of 3-beta-acetoxy-5,7,9(11)-pregnatrien-20-one and 0.95 gram of p-toluenesulfonic acid in 150 milliliters of acetic anhydride was distilled slowly for four hours, at the end of which period the twenty milliliters of acetic anhydride which remained was removed in vacuo. The residue was dissolved in ether, washed with five percent sodium bicarbonate and water, dried, and evaporated to dryness. The crude dark product was treated with Darco activated carbon and crystallized from alcohol to give 0.6 gram of crystalline maleic anhydride adduct of 3-beta-,20-diacetoxy-5,7,9-(11),17(20)-pregnatetraene, melting at 196 to 217 degrees centigrade. After several recrystallizations from methanol, it melted at 217.5–219 degrees centigrade.

Analysis:
Calculated for $C_{29}H_{34}O_7$ -- C, 70.42; H, 6.93
Found ------------------ C, 70.54; H, 7.05
                         70.40;    6.71

PREPARATION 19

In the manner of the preceding example, the following compounds were prepared:
(1) The dimethyl maleate adduct of 3-beta-, 20-diacetoxy - 5,7,9(11),17(20) - pregnatetraene, having a double melting point of 116–119 degrees and 164–168 degrees centigrade.

Analysis:
Calculated for $C_{31}H_{40}O_8$ -- C, 68.86; H, 7.46
Found ------------------ C, 69.04; H, 7.69
                         68.71;    7.80

(2) The dimethyl maleate adduct of 3-beta-acetoxy-20 - propionoxy-5,7,9(11),17(20) - pregnatetraene having, by infra red spectroscopy, an absorption peak in the ester region at 1742 cm.$^{-1}$, characteristic of the C=C—O acyl grouping; and having lost the strong carbonyl absorption at 1700 cm.$^{-1}$ of the starting C–20 ketone.

In the same manner as given above, other 3,20-diacyloxypregnatetraene adducts including 3,20-dipropionoxy - 5,7,9(11),17(20)-pregnatetraene maleic anhydride adduct, 3-acetoxy-20-propionoxy-5,7,9(11),17(20)-pregnatetraene maleic anhydride adduct, 3-octanoyloxy-20-octanoyloxy - 5,7,9(11),17(20) - pregnatetraene dimethyl maleate adduct, 3 - benzoyloxy - 20 - acetoxy-5,7,9(11),17(20)-pregnatetraene maleic anhydride adduct, 3-butyroxy - 20 - benzoyloxy - 5,7,9(11), 17(20)-pregnatetraene maleic anhydride adduct, 3-formoxy-20-acetoxy-5,7,9(11),17(20)-pregnatetraene dimethyl maleate adduct, 3,20-dibutyroxy-5,7,9(11),17(20)-pregnatetraene dibutyl maleate adduct, and the like, are prepared.

*Example 1.—3-beta-,20 - diacetoxy - 9(11),17(20) dioxido-5,7-pregnadien dimethyl maleate adduct*

In a 500 milliliter erlenmeyer flask is dissolved 5.35 grams of 3-beta-,20-diacetoxy-5,7,9(11), 17(20)-pregnatetraene maleic acid dimethyl ester adduct in 220 milliliters of acetic acid. To this solution is added a solution of 22 milliliters of 30 percent hydrogen peroxide in 75 milliliters of acetic acid. The resulting solution is heated on the steam bath for four hours and allowed to cool at room temperature overnight. It is then poured into 2000 grams of crushed ice and extracted, after the ice has melted, with three 300 milliliter portions of methylene chloride. The methylene chloride solution is washed with water, dried over anhydrous sodium sulfate, and evaporated to dryness in vacuo. The residue is dissolved in acetone, an equal amount of isopropyl ether is added, and the solution concentrated on the steam bath until crystallization starts. Upon cooling and filtering, the yield is 2.95 grams, melting at 236-240 degrees centigrade. After several recrystallizations from the same solvent, the melting point is raised to 270-272 degrees centigrade. This material appears to be a mixture of isomeric compounds of different melting points.

*Example 2.—3-beta-,20-diacetoxy - 9(11),17(20) dioxido-5,7-pregnadien maleic anhydride adduct*

To a solution of 3.44 grams of the maleic anhydride adduct of 3,20-diacetoxy-5,7,9(11),17(20) pregnatetraene in 100 milliliters of acetic acid is added a solution of 6.2 milliliters of thirty percent hydrogen peroxide in forty milliliters of acetic acid. The mixture is heated on the steam bath for 3.5 hours, allowed to stand at room temperature overnight, and poured over 500 grams of crushed ice. The resulting solid (2.23 grams, M. P. 195-217 degrees centigrade) is twice recrystallized from methanol to give 0.81 gram of 3,20-diacetoxy - 9(11),17(20) - dioxido-5,7-pregnadien maleic anhydride adduct, melting at 239-250 degrees centigrade.

*Example 3.—3 - beta-acetoxy - 20 - propionoxy-9(11),17(20)-dioxido-5,7-pregnadien dimethyl maleate adduct*

In the same manner as given above in the preceding examples, 3-beta-acetoxy-20-propionoxy - 9(11),17(20) - dioxido - 5,7 - pregnadien dimethyl maleate adduct is prepared from the dimethylmaleate adduct of 3-beta-acetoxy-20-propionoxy - 5,7,9(11),17(20) - pregnatetraene, prepared as in Preparation 19, by reaction with four molar equivalents of hydrogen peroxide in a glacial acetic acid medium.

*Example 4.—3 - benzoyloxy - 20 - acetoxy - 9(11), 17(20)-dioxido - 5,7 - pregnadien maleic anhydride adduct*

This compound is prepared in the manner of the preceding examples, using hydrogen peroxide in a glacial acetic acid medium, from 3-benzoyloxy-20-acetoxy - 5,7,9(11),17(20)-pregnatetraene maleic anhydride adduct, which is prepared in the manner of Preparation 18.

In the same manner as given above, other 3,20 - diacyloxy-9(11),17(20)-dioxido - 5,7 - pregnadien adducts, are prepared, including 3,20-dipropionoxy-9(11),17(20) - dioxido-5,7-pregnadien maleic anhydride adduct, 3-acetoxy,20-butyroxy-9(11),17(20)-dioxido - 5,7 - pregnadien maleic anhydride adduct, 3-octanoyloxy-,20-octanoyloxy-9(11),17(20)-dioxido - 5,7 - pregnadien dioctyl maleate adduct, 3-benzoyloxy-,20-acetoxy-9(11),17(20)-dioxido-5,7-pregnadien diethyl maleate adduct, 3-butyroxy-,20-acetoxy-9(11), 17(20)-dioxido-5,7-pregnadien maleic anhydride adduct, 3-formoxy-,20-acetoxy-9(11),17(20)-dioxido-5,7-pregnadien dimethyl maleate adduct, 3,20-dibutyroxy-9(11),17(20)-dioxido - 5,7 - pregnadien dibutyl maleate adduct, and the like.

In the same manner as given above for the anhydride adducts, the diacyloxy dioxido maleimide and N-alkylmaleimide adducts are prepared from the corresponding 3,20-diacyloxy-5,7,9(11),17(20)-pregnatetraene adducts.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A 3,20-diacyloxy-9(11),17(20)-dioxido-5,7-pregnadien adduct represented by the formula:

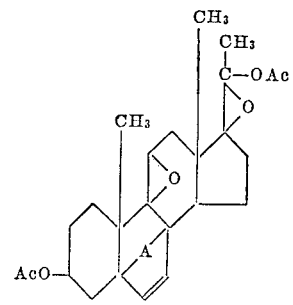

wherein Ac is the residue of an unsubstituted organic monocarboxylic acid containing from one to eight carbon atoms, inclusive, and wherein A is the adduct radical of a dienophile selected from the group consisting of maleic anhydride and maleic acid lower-alkyl diesters, wherein the lower-alkyl groups contain from one to eight carbon atoms, inclusive.

2. A 3-acetoxy-20-acyloxy - 9(11),17(20)-dioxido-5,7-pregnadien dimethyl maleate adduct, wherein the acyloxy group has the formula AcO, Ac being the residue of an unsubstituted aliphatic monocarboxylic acid containing up to and including eight carbon atoms.

3. 3,20 - diacetoxy - 9(11),17(20)-dioxido-5,7-pregnadien dimethyl maleate adduct.

4. 3,20 - diacetoxy - 9(11),17(20)-dioxido-5,7-pregnadien maleic anhydride adduct.

ROBERT H. LEVIN.
A VERN McINTOSH, JR.
GEORGE B. SPERO.

REFERENCES CITED

The following references are of record in the file of this patent:

UNITED STATES PATENTS

| Number | Name | Date |
| --- | --- | --- |
| 2,265,143 | Butenandt | Dec. 9, 1941 |
| 2,312,344 | Logemann | Mar. 2, 1943 |